United States Patent [19]

Ward et al.

[11] 4,013,761

[45] Mar. 22, 1977

[54] CHLORINE DIOXIDE GENERATION

[75] Inventors: William J. Ward, Lenexa; Kenneth E. Gasper, Overland Park, both of Kans.

[73] Assignee: Olin Corporation, New Haven, Conn.

[22] Filed: Jan. 23, 1976

[21] Appl. No.: 651,685

[52] U.S. Cl. .............................. 423/477; 210/62; 23/282; 137/604
[51] Int. Cl.² ................................. C01B 11/02
[58] Field of Search ......... 423/477; 23/252 A, 282; 210/61, 62; 137/3, 93, 604

[56] References Cited

UNITED STATES PATENTS

| | | | |
|---|---|---|---|
| 3,269,941 | 8/1966 | LeCompte et al. | 210/61 |
| 3,420,637 | 1/1969 | Halff et al. | 210/62 |
| 3,502,443 | 3/1970 | Westerlund | 23/282 |
| 3,779,261 | 12/1973 | Zygiel | 137/3 |
| 3,816,077 | 6/1974 | Fuller et al. | 23/252 A |

FOREIGN PATENTS OR APPLICATIONS

| | | | |
|---|---|---|---|
| 1,069,122 | 11/1959 | Germany | 423/477 |
| 1,467,024 | 11/1969 | Germany | 423/477 |

Primary Examiner—Oscar R. Vertiz
Assistant Examiner—Brian E. Hearn
Attorney, Agent, or Firm—William A. Simons; F. A. Iskander

[57] ABSTRACT

The present invention is directed to a chlorine dioxide generation apparatus and a method of generating chlorine dioxide using the apparatus. The novel apparatus includes a generation vessel having leak-inhibiting solvent weld joints with reducing couplings which form an inlet and outlet. The reducing couplings advantageously have surfaces which form an angle of at least 110° with the vessel walls to create a geometry which prevents chemicals buildup during operation of the apparatus.

13 Claims, 2 Drawing Figures

CHLORINE DIOXIDE GENERATION

This invention relates to the production of chlorine dioxide and more particularly to a novel apparatus and its use in the production of chlorine dioxide.

Chlorine dioxide is utilized in a variety of bleaching processes, and in a large number of bactericidal applications, e.g., in the fields of water treatment, odor abatement, phenol destruction, etc. Due to the unstable nature of gaseous chlorine dioxide when compressed, it is necessary to produce chlorine dioxide at its location of use rather than to produce it at a plant and ship it for use. A common technique involves the production of chlorine dioxide in a generator by reaction of various starting materials and then feeding the generated chlorine dioxide, e.g., in an aqueous solution, to the material or system to be treated.

In general, chlorine dioxide generators are constructed of large diameter glass or plastic tubing and have flange arrangements which usually involve bolted fittings and fixtures for inlet and outlet attachment. See, for example, Pennwalt Corporation sales brochure entitled "Chlorine Dioxide Generator, Series A-707", Wallace & Tiernan Division, Belleville, NJ, Cat. File 60.310, June 1970. While these generators are reasonably reliable in the field, they are prone to leakage and require periodic inspection and occasional repair with concomitant time loss and expense. Additionally, these generators usually have flat flanges which form 90° angles with the tubing walls and which thereby create pockets into which a buildup of potentially hazardous gases may occur. Not only does this buildup result in a loss of material and therefore a possibly irregular generation of chlorine dioxide, but there is some speculation that a buildup of chlorine dioxide in these pockets might create an explosion hazard.

It has now been discovered that these problems may be overcome and that a superior method of generating chlorine dioxide may be achieved by the present invention. Thus, in the novel apparatus of the present invention and its use in the generation of chlorine dioxide, leakage problems are significantly reduced and within the generator virtually eliminated, servicing requirements are likewise reduced, chemicals buildup within the generator is essentially eliminated and the above-mentioned possible explosion hazard is obviated.

The novel apparatus of the present invention includes a chlorine dioxide generation vessel, optional mixing means within the vessel, and starting materials sources, metering means and injection means.

The generation vessel is made of an oxidizing agent-inert plastic material and has walls which define a confined space for fluid flow in an overall mean flow direction approximately parallel to the vessel walls. By plastic material is meant any material which may be joined with itself by the well-known solvent welding or bonding techniques. Among these plastic materials are the synthetic materials which are inert to oxidizing agent attack and which may be solvent welded. Particularly useful are the high polymer resins and plastics such as polyvinyl chloride and the like. The choice of material is not critical provided that it is solvent weldable and is inert to the attack of oxidizing agents, as mentioned. Such materials are well within the knowledge of one of ordinary skill in the art and are available on a commercial basis.

The generation vessel walls may be of any geometry desired as long as no pockets or corners are created in the direction of overall flow of fluid in the vessel which would create detrimental chemicals buildup. The walls may have a rectangular cross-section or a circular cross-section or any other configuration subject to the preceding proviso. A particularly advantageous geometry for the vessel walls is a simple circular cross-section, i.e., the walls may be tubular.

An important aspect in the geometry of the generator vessel involves the avoidance of problematic pockets and the increased mixing capabilities by employing a reducing coupling at each end of the vessel walls to form an inlet and an outlet. These reducing couplings are advantageously solvent welded to the vessel walls and the need for flanges and bolts is eliminated and the likelihood of leakage during use is thereby substantially reduced. Additionally, the couplings have surfaces which reduce the cross-sectional area of the confined spaced defined by the vessel walls and these surfaces form an angle of at least 110° and preferably at least 125°, with the vessel's vertical walls. The formation of angles this size, or greater, between the vessel's vertical walls and the reducing surfaces of the couplings assures that no pocket areas are created near the inlet and outlet.

In the apparatus of the present invention, the inlet of the generation vessel has connected to it the sources of reactants which when combined form the chlorine dioxide. Since these starting materials are combined for the first time at the inlet and the generation of chlorine dioxide occurs within the vessel, some mode of mixing these reactants is desirable. Thus, the reactor vessel may optionally contain mixing means to enhance reaction completion and to enhance outlet solution homogeneity. The mixing means may be in the form of a motor-driven agitator or may be in the form of a screw type configuration within the vessel, or other techniques may be used. For example, mixing material such as packing, e.g., plastic or glass or ceramic saddles or rings, may simply be placed within the vessel. It should be recognized that any mixing means may be employed as long as it is inert to the chemicals involved in the generation of the chlorine dioxide. Packing material is one preferred mixing means because it is simple and inexpensive.

As mentioned, starting materials are fed to the generation vessel to produce chlorine dioxide, and starting material sources are, therefore, connected to the generation vessel inlet. In general, the sources are connected to the inlet by an injection check valve to prevent back flow of other starting materials to the respective sources. The starting materials are fed to the injection check valves (and therefore through the inlet to the vessel) via some form of metering means. The metering means may be any known means, e.g., pump systems having flow regulation or gravity flow systems with flow regulation.

In general terms, the novel apparatus of the present invention contains the generation vessel, couplings and fluid mixing means, as mentioned, and contains an aqueous sodium chlorite solution source and at least one other starting material source. An injection check valve connects each of these sources via metering means.

In one embodiment of the present invention, an aqueous sodium chlorite solution source is used in combination with a water source. The pH of the water source should be from about 2 to about 9, and preferably about 3.5 to about 4.5. Thus, a minimum of about 300 mg/l, and preferably about 1,000 to about 1,500 mg/l of chlorine in the form of hypochlorous acid should be used. As a result of the chlorine present in this form, a pH of no greater than 4.5 and preferably between 3.5 and 4.5 may be maintained. This active chlorine and the sodium chlorite solution reacts to generate an aqueous solution of chlorine dioxide. The chlorinated water and the aqueous sodium chlorite solution are combined in the vessel at regulated proportions by the above-mentioned metering means so that about 0.2 to about 1.2 moles of hypochlorous acid, and preferably about 0.4 to about 0.6 moles of hypochlorous acid, is used per mole of sodium chlorite.

In another embodiment of the present invention, an aqueous sodium chlorite solution source is used in combination with a sodium hypochlorite source, and a mineral acid source. The sodium hypochlorite source generally contains the sodium hypochlorite in an aqueous solution having about 2% to about 30%, preferably about 10% to about 25%, by weight of the hypochlorite based on the total weight of the solution. (Reactants functionally equivalent to sodium hypochlorite may, of course, be substituted without exceeding the scope of the present invention, as is the case with other reactants described herein.) The mineral acid source may contain sulfuric acid or it may contain a hydrohalic acid. Preferred is hydrochloric acid. Generally the mineral acid is in an aqueous solution containing about 5% to about 40%, preferably about 20% to about 30%, by weight of mineral acid based on the total weight of the solution. In this embodiment the sodium hypochlorite solution is combined with the mineral acid and the aqueous sodium chlorite solution at the generation vessel inlet at a rate so that about 0.4 to about 1.0 moles, and preferably about 0.6 to about 1.0 moles, of sodium hypochlorite is combined with each mole of sodium chlorite. The mineral acid is combined with the other starting materials so that about 0.1 to about 1.0 moles, and preferably about 0.3 to about 0.7 moles of the mineral acid is added per mole of sodium chlorite.

In either of the above embodiments, and in any variation thereon, an optional water source may be included in the system. This water source may be employed to dilute the reactants and the generated chlorine dioxide as desired. Thus, where the water from the various aqueous starting materials is adequate, an additional water source is not necessary. For example, when a chlorinated water source is employed, this water may be sufficient for optimal operation of the apparatus. On the other hand, a system employing relatively substantial concentrations of sodium hypochlorite and mineral acid may advantageously include an additional water source. In any event, it is desired that ultimately a mixture within the generation vessel will contain about 95% to about 99.9%, or even greater, and preferably about 98% to about 99.9%, by weight of water based on the total weight of the water and the starting materials.

The following examples described in conjunction with the drawings are presented to further illustrate the present invention, but the invention should not be construed to be limited thereto:

FIGURE 1

Figure 1:
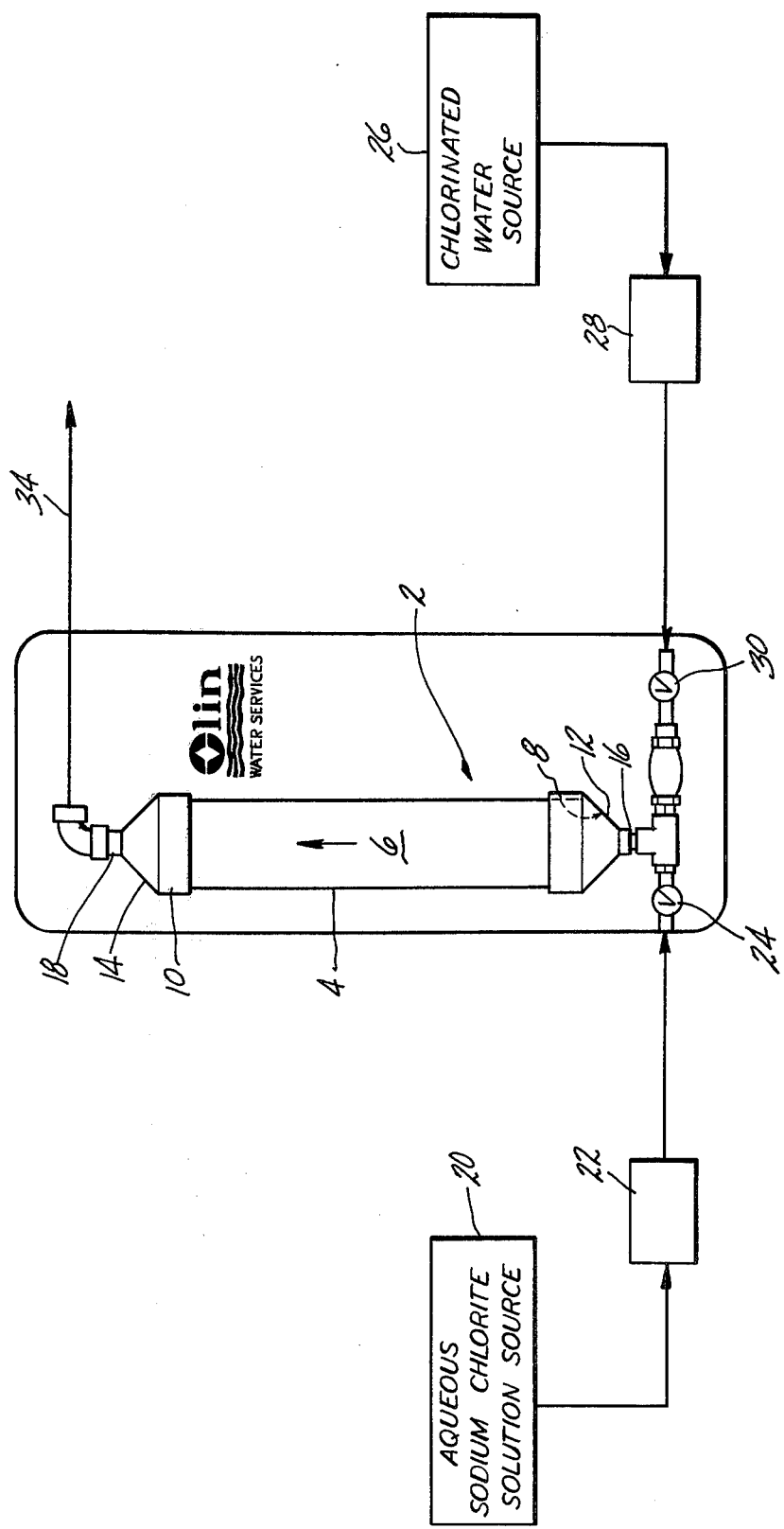
FIG. 1 illustrates an apparatus of the present invention showing a generation vessel in combination with a two starting material source system.

FIG. 1 shows an embodiment of the present invention wherein aqueous sodium chlorite and chlorinated water are reacted to generate chlorine dioxide. A chlorine dioxide generation vessel on a mounting board is shown generally as 2. The generator has polyvinyl chloride walls 4 which define a confined space 6 wherein fluid may flow in an overall mean flow direction parallel to the walls as shown by the vertical arrow in space 6. The vessel 2 contains within the space 6 fluid mixing means in the form of ceramic saddles (not shown). The vessel 2 has two polyvinyl chloride couplings 8 and 10. Couplings 8 and 10 are attached to walls 4 by solvent welding joints (not shown). Couplings 8 and 10 have surfaces 12 and 14 which reduce the cross-sectional area of the confined space 6 and surfaces 12 and 14 form angles greater than 125° with the walls 4 as shown by the dotted lines. Inlet 16 and outlet 18 are established by couplings 8 and 10 respectively.

Aqueous sodium chlorite solution source 20 is connected to injection check valve 24 at inlet 16 via metering pump 22. Chlorinated water source 26 is likewise connected to the generation vessel 2. Source 26 is connected to injection valve 30 via metering pump 28. The chlorinated water source may be a commercially available chlorinator and may use water from the water system to be treated with chlorine dioxide. For this reason an optional filter may be employed to maintain the generation vessel free of detrimental impurities.

Outlet 18 is shown connected to a line 34 for transmission of the chlorine dioxide generated in an aqueous solution to the water system to be treated.

EXAMPLE A

The novel apparatus shown in FIG. 1 is used as follows:

A large U.S. Midwestern aluminum producer uses cooling water to cool the mold box of their continuous casting machine as well as for normal cooling uses in their plant. As part of the continuous casting process, the cooling water also contacts the cast aluminum. About 10 to 12 pounds of a vegetable oil-type mold lubricant is used to facilitate the removal of the casting from its mold. Cooling water, which comes in direct contact with the casting, becomes contaminated with between 10 and 60 mg/l of this oil and carries it to all parts of the cooling system. The vegetable oil lubricant, which has entered the cooling water, acts as a nutrient to encourage microbiological growth. Slime masses were evident on the tower fill and a septic odor was present near the cooling tower. Mechanical oil removal was designed into the plant but was not able to remove enough of the oil to prevent microbiological problems.

Heavy dosages of chlorine gas were used (by means of a chlorinator) but were unable to control the slime. A wide variety of non-oxidizing microbiocides were tried and also failed to control the growths. Combinations of chlorine and non-oxidizing microbiocides also proved ineffective. Manual cleaning of the tower during production shutdowns was necessary to recover some of the heat transfer capability. Even this gave only short-term relief due to heavy recontamination and a continuing resupply of nutrient from the oil.

Make-up water to this system was from a high quality potable water source. A typical analysis of the make-up water appears in Table I below. The recirculating water had a range of analyses similar to that presented in Table II below. The tower, a two-cell induced draft unit with a concrete basin, had a recirculating rate of approximately 4000 GPM and a temperature change of about 10° to 12° F operating in the range of about 85° to 105° F. The system capacity was approximately 225,000 gallons (U.S.).

Chlorine dioxide was chosen for use in this system because it was less likely to react with the contaminating oils than was chlorine and it had a wider range of activity at higher system pHs. Chlorine dioxide was generated in solution at the jobsite in an apparatus such as is shown in FIG. 1. The effluent stream from the existing gas chlorinator was used as chlorinated water source 26 (FIG. 1). This chlorinated water contained about 1,000 ppm active chlorine and was fed to the generation vessel at a rate of about 3 GPM. A 25% (active) by weight sodium chlorite aqueous solution was fed to the generation vessel at a rate of about 1.5 GPH. At these flow rates, about 0.5 moles of active chlorine was combined with each mole of sodium chlorite. The hold-up volume of the generator was about 1 gallon of total solution. Chlorine dioxide formed instantaneously and was immediately taken into solution by the water stream. The $ClO_2$ solution was then injected into the cooling water at two points in the system.

As soon as the $ClO_2$ system was started, the septic odor in the area disappeared and was replaced by a sweet, faint chlorine odor. A $ClO_2$ residual was found by DPD test in a few hours. The water become murky and it was necessary to clean the pump and case house strainers at frequent intervals as large slime masses sloughed off. The underwater areas of the tower basin were the first to clean up, followed by the fill sections of the tower. During the clean-up portion of the program, heavy blowdown was necessary to rid the system of dead organic material. A scheduled production shutdown afforded the opportunity to manually clean the remaining debris from the system. When production was resumed, the $ClO_2$ dosage and frequency were reduced to a maintenance level, residuals were set at less than 1.0 mg/l of $ClO_2$ (DPD) for four hours per day on a daily basis. Non-oxidizing biocides were used on a weekly "slug" basis to control potentially resistant strains and to penetrate and disperse persistant slime masses.

This plant was operated for over seven months on the chlorine dioxide system and was found to be in excellent condition from a microbiological control standpoint. There were no operating problems due to microbiological growths and their attending heat transfer problems. Corrosion control was improved in this system because of the cleaner surface afforded by the chlorine dioxide program. During the entire operation of the chlorine dioxide generation system, no chlorine dioxide or other chemicals buildup was observed in the generation vessel and no leakage occured.

Table I

| Typical Make-Up Water Analysis | | |
|---|---|---|
| Constituent | Expressed As | mg/l |
| Total Hardness | $CaCO_3$ | 80 |
| Calcium Hardness | $CaCO_3$ | 40 |
| Magnesium Hardness | $CaCO_3$ | 34 |
| Total Iron | Fe | 1.2 |

Table I-continued

| Typical Make-Up Water Analysis | | |
|---|---|---|
| Constituent | Expressed As | mg/l |
| pH | Units | 6.6 |
| TDS | NaCl | 100 |
| Total Alkalinity | $CaCO_3$ | 52 |
| Chloride | Cl | 25 |
| Silica | $SiO_2$ | 20 |

Table II

| Recirculating Water Analysis Range | | |
|---|---|---|
| Constituent | Expressed As | mg/l |
| Total Hardness | $CaCO_3$ | 80 – 120 |
| Calcium Hardness | $CaCO_3$ | 40 – 75 |
| Total Iron | Fe | 0.6 – 4.0 |
| pH | Units | 5.8 – 7.8 |
| Total Alkalinity | $CaCO_3$ | 10 – 65 |
| Chloride | Cl | 30 – 120 |
| Silica | $SiO_2$ | 20 – 35 |
| Total Organic Carbon | C | 10 – 60 |

FIG. 2

Figure 2:
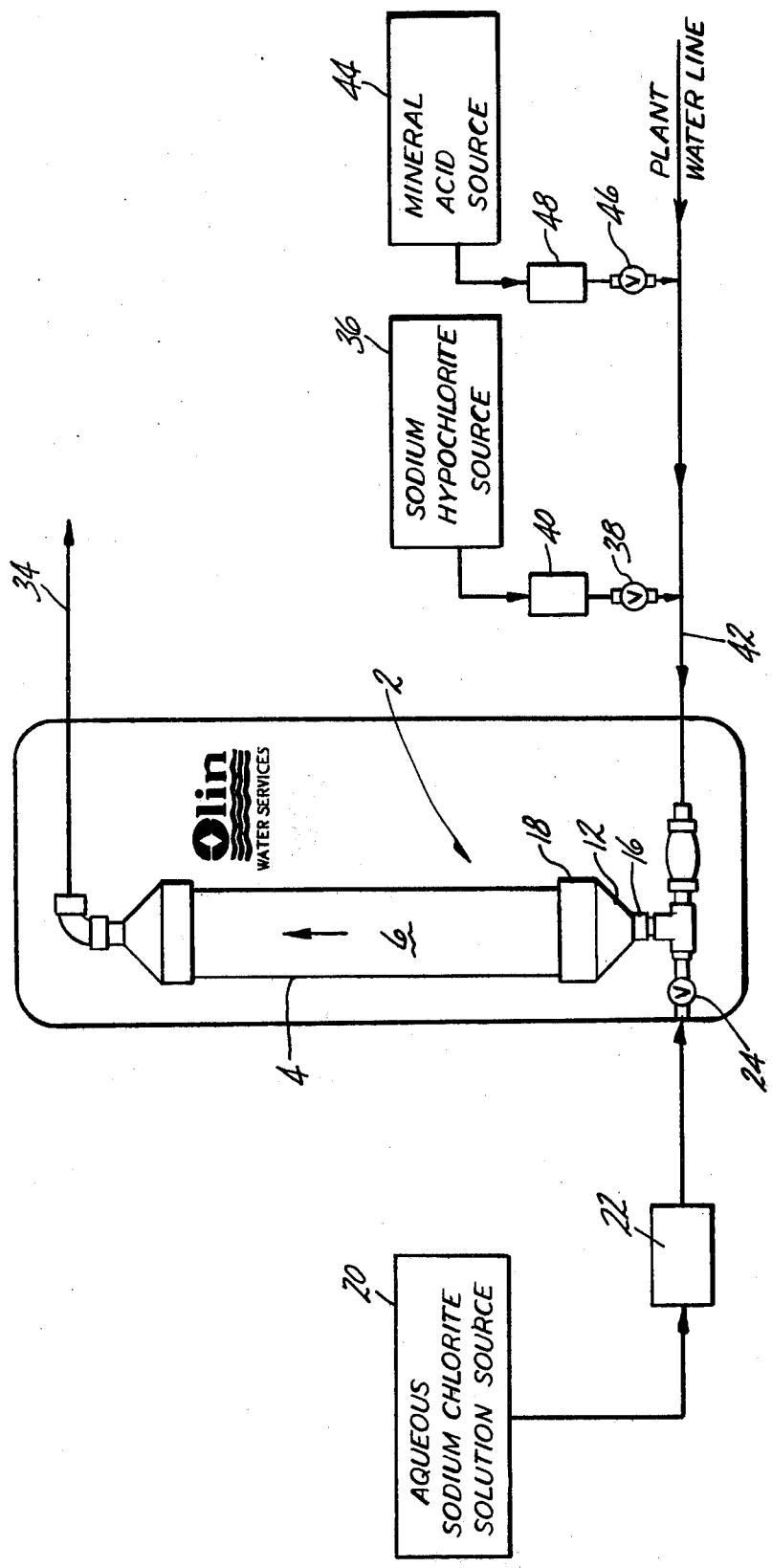
FIG. 2 illustrates an apparatus of the present invention showing a generation vessel in combination with a three starting material source system.

FIG. 2 shows an embodiment of the present invention wherein aqueous sodium chlorite, sodium hypochlorite, and a mineral acid are reacted to generate chlorine dioxide. Portions of the drawing which are identical to those shown in FIG. 1 are identically numbered. Aqueous sodium chlorite solution source 20 is connected to injection check valve 24 at inlet 16 via metering pump 22. Sodium hypochlorite source 36 is connected to injection check valve 38 via metering pump 40. Injection check valve 38 connects the sodium hypochlorite source feed line to inlet 16 via plant water line 42. Mineral acid source 44 is connected to injection check valve 46 via metering pump 48 and the mineral acid feed line is connected to inlet 16 via plant water line 42. Plant water line 42 is used to supply diluent water to the generation vessel and to pick up both the mineral acid and the sodium hypochlorite as it is being fed to the generation vessel inlet.

Outlet 18 is shown connected to line 34 for transmission of the chlorine dioxide generated to the water system to be treated in the form of an aqueous solution.

EXAMPLE B

The novel apparatus shown in FIG. 2 is used as follows:

A large plant of a major meat packing firm recovers blood solids from their meat-packing operations via a drying recovery operation. Liquid by-product blood is accumulated in batch tanks until a quantity sufficient for an economical drier run has been collected. The drier is then started up to recover the blood in solid form, evaporating the moisture to the atmosphere. Cyclones concentrate the dried blood solids. From the cyclones, the exhaust gases pass through a venturi scrubber and then into a packed counter-flow-type air scrubber. The air scrubber had an 800-gallon (U.S.) reservoir and recirculated the scrubber water at the rate of 350 GPM. Fresh water (plant supply) was used as make-up at the rate of 5 GPM. Ammonia levels as high as 1000 mg/l were observed and averaged approximately 500 mg/l in the recirculating water. Hypochlorite solutions were used in an unsuccessful attempt to control the obnoxious odors present in the scrubber effluent gases.

Chlorine dioxide was chosen to replace hypochlorite because of its selective oxidant properties and because it would not react with the ammonia contamination known to be present. An apparatus such as that shown in FIG. 2 was chosen instead of the FIG. 1 type because a gas chlorinator, or chlorinated water, was unavailable at the site. An aqueous sodium chlorite solution containing 25% (active) sodium chlorite by weight, was used in starting material source 20. An aqueous sodium hypochlorite solution containing about 15% sodium hypochlorite by weight was used in starting material source 36. A 30% concentration of hydrochloric acid solution was used in mineral acid source 44. Plant water was pumped through line 42 at a rate of about 6 GPM, the hydrochloric acid solution was fed to line 42 at a rate of about 0.25 GPH, and the sodium hypochlorite solution was fed to line 42 at a rate of about 0.5 GPH. The combined flow through line 42 was fed to generation vessel 4 via inlet 16 and the aqueous sodium chlorite solution was mixed therewith by being fed to inlet 16 at a rate of about 0.7 GPH. Thus, about 0.5 moles of sodium hypochlorite and about 0.5 moles of hydrochloric acid were combined with each mole of sodium chlorite. Chlorine dioxide was generated instantaneously and transmitted from the generation vessel via line 34 to the scrubber tower recirculating line. Total chlorine dioxide feed was estimated to be about 135 mg/l based on the recirculating water flow. A chlorine dioxide residual was observed by DPD measurement. A short time after the generator was started, a $ClO_2$ residual was observed but this excess seldom exceeded 2.0 mg/l during the run. After a short period of treatment with the chlorine dioxide, the offensive odors issuing from the air scrubber were replaced by a sweet, faint, chlorine odor.

Microbial plant counts made before and during chlorine dioxide treatment indicated a sharp drop in the total number of microbial organisms. Prior to chlorine dioxide treatment, the water contained over 1,000,000 microorganisms per milliliter and within a few hours of chlorine dioxide treatment contained less than 1,000 microorganisms per milliliter. The chlorine dioxide generation technique proved to be an effective means of controlling offensive odor and microbiological counts in this blood solids recovery plant. No chlorine dioxide or other chemical buildup was observed in the generation vessel during the entire operation and no leakage occurred.

What is claimed is:

1. A method of generating chlorine dioxide and producing an aqueous stream containing the generated chlorine dioxide, comprising:
    i. feeding an aqueous sodium chlorite solution to the inlet of a chlorine dioxide generation vessel, said vessel being made of an oxidizing agent-inert plastic material, and said vessel having walls defining a confined space for fluid flow in an overall mean flow direction approximately parallel to said walls; at least two reducing couplings, at least one of said couplings being located at one end of said vessel and attached to said walls to form an inlet and at least one other of said couplings being located at the other end of said vessel and attached to said walls to form an outlet, said couplings being attached to said vessel walls by solvent weld, said couplings having surfaces which reduce the cross-sectional area of said confined space defined by said vessel walls, said coupling surfaces forming an angle of at least 110° with said vessel walls; said aqueous sodium chlorite solution being fed to the inlet by metering the aqueous sodium chlorite solution from an aqueous sodium chlorite solution source to said inlet via an injection check valve;
    ii. feeding a chlorinated water stream containing hypochlorous acid ions to said inlet at a rate so as to supply at least about 0.2 moles to about 1.2 moles of hypochlorous acid per mole of sodium chlorite, said water stream having a pH between about 2 and about 9;
    iii. mixing and reacting said sodium chlorite solution and said chlorinated water stream within said vessel; and
    iv. withdrawing from the outlet of said vessel an aqueous stream containing chlorine dioxide reaction product.

2. The method of claim 1 wherein at least about 0.4 to about 0.6 moles of hypochlorous acid is supplied per mole of sodium chlorite.

3. The method of claim 2 wherein said chlorinated water stream has a pH between about 3.5 and about 4.5.

4. The method of claim 1 wherein said chlorinated water is produced in a water chlorination gas chlorinator system.

5. The method of claim 1 wherein said angle is at least 125°.

6. A method of generating chlorine dioxide and supplying an aqueous stream containing the generated chlorine dioxide, comprising:
    i. feeding an aqueous sodium chlorite solution to the inlet of a chlorine dioxide generation vessel, said vessel being made of an oxidizing agent-inert plastic material, and said vessel having walls defining a confined space for fluid flow in an overall mean flow direction approximately parallel to said walls; at least two reducing couplings, at least one of said couplings being located at one end of said vessel and attached to said walls to form an inlet and at least one other of said couplings being located at the other end of said vessel and attached to said walls to form an outlet, said couplings being attached to said vessel walls by solvent weld, said couplings having surfaces which reduce the cross-sectional area of said confined space defined by said vessel walls, said coupling surfaces forming an angle of at least 110° with said vessel walls; said aqueous sodium chlorite solution being fed to the inlet by metering the aqueous sodium chlorite solution from an aqueous sodium chlorite solution source to said inlet via an injection check valve;
    ii. feeding an aqueous sodium hypochlorite solution to said inlet by metering the sodium hypochlorite solution through an injection check valve to said inlet at a rate of about 0.4 to about 1.0 moles of sodium hypochlorite per mole of sodium chlorite;
    iii. feeding a mineral acid to said inlet by metering the mineral acid through an injection check valve to said inlet at a rate of about 0.10 to about 1.0 moles of mineral acid per mole of sodium chlorite;
    iv. mixing and reacting said sodium chlorite solution, said sodium hypochlorite solution and said mineral acid in said vessel and minimizing the heat buildup resulting from the exothermic reaction by feeding a water stream to said vessel; and v. withdrawing from the outlet of said vessel an aqueous stream containing chlorine dioxide reaction product.

7. The method of claim 6 wherein said mineral acid is selected from the group consisting of sulfuric acid, hydrohalic acid and mixtures of these.

8. The method of claim 6 wherein said mineral acid is hydrochloric acid.

9. The method of claim 6 wherein about 0.6 to about 1.0 moles of sodium hypochlorite is used per mole of sodium chlorite.

10. The method of claim 9 wherein about 0.3 to about 0.7 moles of mineral acid is used per mole of sodium chlorite.

11. The method of claim 10 wherein said mineral acid is selected from the group consisting of sulfuric acid, hydrohalic acid and mixtures of these.

12. The method of claim 10 wherein said angle is 125°.

13. The method of claim 10 wherein said mineral acid is hydrochloric acid.

* * * * *